(12) United States Patent
Opificius et al.

(10) Patent No.: US 11,242,152 B2
(45) Date of Patent: Feb. 8, 2022

(54) METHOD AND APPARATUS FOR DETECTING ICE ACCRETION

(71) Applicant: GE Aviation Systems LLC, Grand Rapids, MI (US)

(72) Inventors: Julian Alexander Opificius, Elk River, MN (US); Stephen Craig Carlson, Roscoe, IL (US)

(73) Assignee: GE Aviation Systems LLC, Grand Rapids, MI (US)

( * ) Notice: Subject to any disclaimer, the term of this patent is extended or adjusted under 35 U.S.C. 154(b) by 359 days.

(21) Appl. No.: 15/816,452

(22) Filed: Nov. 17, 2017

(65) Prior Publication Data
US 2019/0152614 A1    May 23, 2019

(51) Int. Cl.
| | | |
|---|---|---|
| *B64D 15/22* | (2006.01) | |
| *B64D 15/12* | (2006.01) | |
| *B64D 33/02* | (2006.01) | |
| *B64D 15/20* | (2006.01) | |

(52) U.S. Cl.
CPC ............. *B64D 15/22* (2013.01); *B64D 15/12* (2013.01); *B64D 15/20* (2013.01); *B64D 2033/0233* (2013.01); *H05B 2214/02* (2013.01)

(58) Field of Classification Search
CPC .................. B64D 15/22; B64D 15/12; B64D 2033/0233; B64D 15/20; H05B 2214/02; B32B 2605/18
See application file for complete search history.

(56) References Cited

U.S. PATENT DOCUMENTS

| | | | | |
|---|---|---|---|---|
| 4,036,457 | A | * | 7/1977 | Volkner ................. B64D 15/14 244/134 D |
| 5,344,696 | A | * | 9/1994 | Hastings ................... B32B 7/02 428/220 |
| 5,474,261 | A | | 12/1995 | Stolarczyk |
| 5,484,121 | A | | 1/1996 | Goldberg |
| 5,521,854 | A | | 5/1996 | Chikamatsu |
| 6,052,056 | A | * | 4/2000 | Burns ..................... B64D 15/20 250/573 |
| 6,320,511 | B1 | | 11/2001 | Jackson |
| 7,175,136 | B2 | | 2/2007 | Shah |
| 7,230,205 | B2 | | 6/2007 | Twerdochlib |
| 7,628,359 | B2 | | 12/2009 | Shah |
| 7,965,201 | B2 | | 6/2011 | Shah |
| 8,517,601 | B2 | * | 8/2013 | Stothers ............... H05B 1/0236 374/110 |
| 8,602,359 | B2 | | 12/2013 | Stothers |
| 8,711,008 | B2 | | 4/2014 | Cook |
| 8,807,483 | B2 | * | 8/2014 | Lewis .................... B64D 15/12 219/202 |
| 9,100,994 | B2 | * | 8/2015 | Orawetz .................. H05B 3/36 |
| 9,201,031 | B2 | | 12/2015 | Bouley |
| 9,242,735 | B1 | | 1/2016 | Meis |
| 9,673,485 | B2 | | 6/2017 | Lee |
| 9,676,485 | B2 | | 6/2017 | Stothers |

(Continued)

*Primary Examiner* — Hunter B Lonsberry
*Assistant Examiner* — Matthew J. Reda
(74) *Attorney, Agent, or Firm* — McGarry Bair PC

(57) ABSTRACT

A method of determining ice accretion on a surface of an aircraft can include supplying a known power to a heating element formed in a patch, wherein the patch includes a temperature sensor. A controller module can compare a sensed thermal signature with a threshold signature and determine the presence of ice accretion on the aircraft.

18 Claims, 6 Drawing Sheets

(56) References Cited

U.S. PATENT DOCUMENTS

| | | | | |
|---|---|---|---|---|
| 9,737,916 | B2* | 8/2017 | Schneider | B64D 15/16 |
| 10,129,932 | B2* | 11/2018 | Briggs | G01K 13/00 |
| 2004/0095984 | A1 | 5/2004 | Severson | |
| 2011/0290784 | A1* | 12/2011 | Orawetz | H05B 3/36 |
| | | | | 219/486 |
| 2012/0061482 | A1* | 3/2012 | Stothers | B64D 15/20 |
| | | | | 237/2 R |
| 2012/0298804 | A1* | 11/2012 | Lewis | B64D 15/12 |
| | | | | 244/134 D |
| 2016/0381734 | A1* | 12/2016 | Briggs | G01K 13/00 |
| | | | | 219/522 |
| 2017/0056939 | A1* | 3/2017 | Schneider | B64D 15/16 |
| 2017/0158336 | A1 | 6/2017 | Drury | |

* cited by examiner

METHOD AND APPARATUS FOR DETECTING ICE ACCRETION

BACKGROUND

The formation of ice on aircraft structures, such as engine inlets, wings, control surfaces, propellers, booster inlet vanes, inlet frames, etc., is a problem for contemporary aircraft. Ice adds weight, increases drag, and impairs the aerodynamic contour of airfoils, control surfaces and inlets, all of which reduce performance and increase fuel consumption. In addition, ice that forms on aircraft structures can become dislodged, increasing risk to other aircraft parts and engine components. Contemporary aircraft can include de-icing or anti-icing detection systems that utilize heat sources or heat generating elements to provide heat to the aircraft structure to melt or prevent the formation of ice.

BRIEF DESCRIPTION

In one aspect, the disclosure relates to a method of determining ice accretion on a surface of an aircraft. The method includes supplying a known power to a heating element, wherein the heating element and a temperature sensor are integrally formed in a patch that forms a surface of the aircraft and has a contour consistent with a surface surrounding the patch, determining, in a controller module, when the heating element has satisfied at least one temperature threshold, altering the supplying of power to the heating element when it is determined that the heating element has satisfied the at least one temperature threshold, sensing, via a sensor, a thermal signature of the heating element to define a sensed thermal signature, comparing, in a controller module, the sensed thermal signature with a threshold signature, determining, in the controller module, if the sensed thermal signature satisfies the threshold signature, indicating, by the controller module, that ice accretion has been determined when the controller module determines that the sensed thermal signature satisfies the threshold thermal signature, and altering operation of an aircraft system based on the indication.

In another aspect, the disclosure relates to a system for determining ice accretion on a portion of an aircraft including a patch that forms a surface of the aircraft and has a contour consistent with a surface surrounding the patch. The patch includes a heat generating surface that operates in thermal cycles defined by a first period of time when the heat generating surface generates heat while energized, and by a second period of time when the heat generating surface does not generate heat while not energized, a sensor adapted to sense a thermal cycle indicative of ice accretion at a location of the patch, and a controller module configured to compare the sensed thermal cycle with a threshold thermal cycle, determine if the sensed thermal cycle satisfies the threshold thermal cycle, and indicate that conditions favorable for icing exist when the sensed thermal cycle satisfies the threshold thermal cycle.

DESCRIPTION OF EMBODIMENTS

Figure 1:
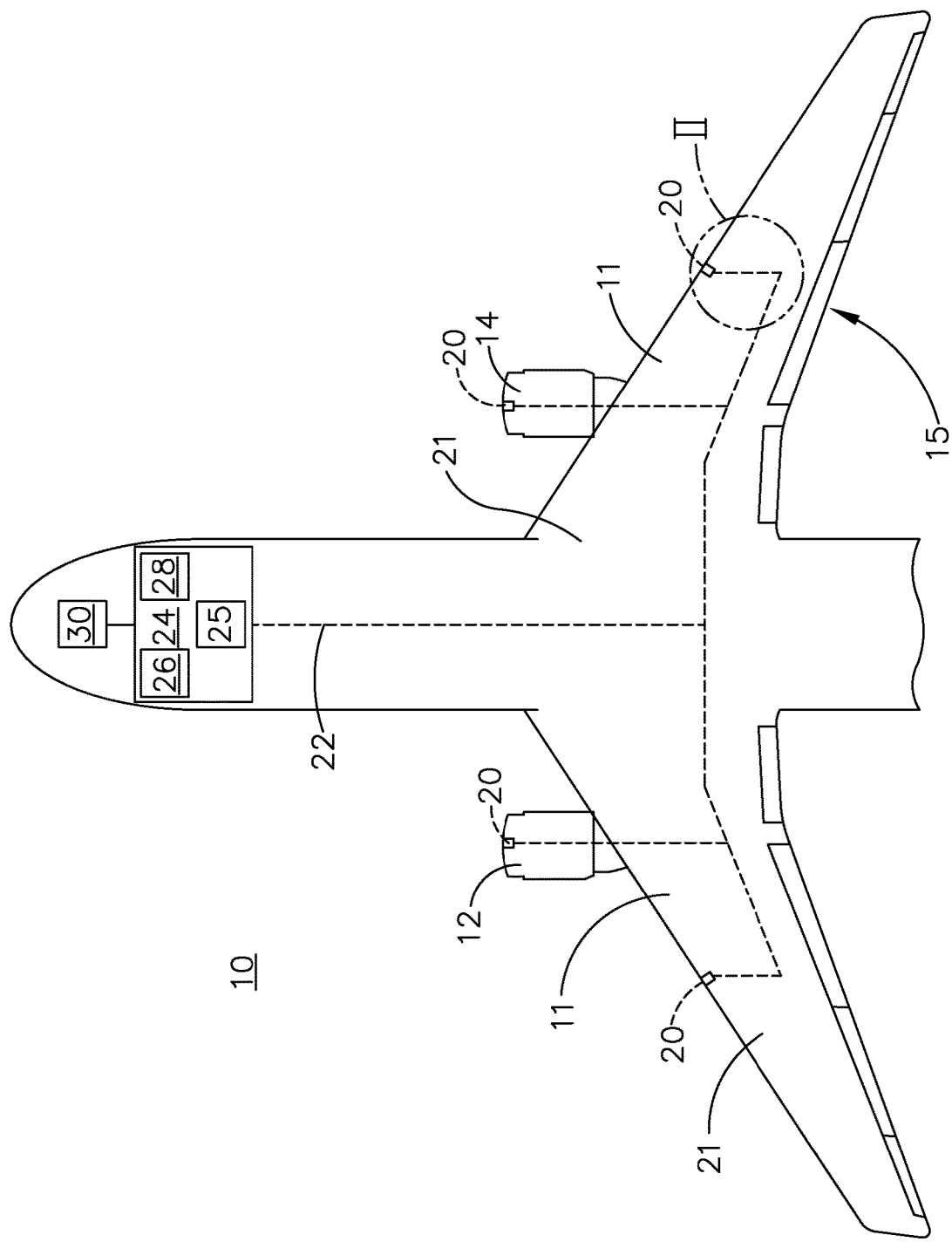
FIG. 1 is a top-down schematic view of an aircraft in accordance with various aspects described herein.

Aspects of the disclosure can be implemented in any environment, apparatus, or method for detecting ice formation or accretion on a surface. One non-limiting exemplary environment described herein includes a method and system for detecting ice accretion on an aircraft structure or housing. Furthermore, the method and system described herein can be applicable to aircraft during flight or non-flight operations.

As used herein, "conditions favorable for the formation of ice" can include environmental conditions that allow for, enable, are conducive to, or can indicate that ice can, will, or may form. Thus, "conditions favorable for the formation of ice" are not limited to environmental conditions wherein ice will form, but can include conditions where it might form. Conditions favorable for the formation of ice can be based on relative, dynamic, or static conditions or values. As conditions favorable for the formation of ice can occur at a wide range of altitudes and temperatures, and can appear with little warning, it is important to detect ice accretion in such conditions as soon as possible.

While "a set of" various elements will be described, it will be understood that "a set" can include any number of the respective elements, including only one element. The use of the terms "proximal" or "proximally," either by themselves or in conjunction with the other components refers to moving in a direction toward a referencing point, or a component being relatively closer to the referencing point, as compared to another component.

Also as used herein, while sensors can be described as "sensing" or "measuring" a respective value, sensing or measuring can include determining a value indicative of or related to the respective value, rather than directly sensing or measuring the value itself. The sensed or measured values can further be provided to additional components. For instance, the value can be provided to a controller module or processor, and the controller module or processor can perform processing on the value to determine a representative value or an electrical characteristic representative of said value. Additionally, while terms such as "voltage", "current", and "power" can be used herein, it will be evident to one skilled in the art that these terms can be interchangeable when describing aspects of the electrical circuit, or circuit operations.

The term "satisfies" or "satisfies the threshold value" is used herein to mean that the sensed value is equal to the threshold value, or being greater or less than the threshold value within a range (e.g. within tolerance). It will be understood that such a determination may easily be altered to be satisfied by a positive/negative comparison or a true/false comparison.

Connection references (e.g., attached, coupled, connected, and joined) are to be construed broadly and can include intermediate members between a collection of elements and relative movement between elements unless otherwise indicated. As such, connection references do not necessarily infer that two elements are directly connected and in fixed relation to each other. In non-limiting examples, connections or disconnections can be selectively configured to provide, enable, disable, or the like, an electrical connection between respective elements. Non-limiting example power distribution bus connections or disconnections can be enabled or operated by way of switching, bus tie logic, or any other connectors configured to enable or disable the energizing of electrical loads downstream of the bus. The exemplary drawings are for purposes of illustration only and the dimensions, positions, order, and relative sizes reflected in the drawings attached hereto can vary.

As used herein, a "system" or a "controller module" can include at least one processor and memory, or other digital electronic technology. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types. Furthermore, programmable hardware including field-programmable gate arrays (FPGA) can also be utilized in the controller module as desired.

FIG. 1 illustrates a schematic top-down view of an aircraft 10, which can include an icing detection system 15 capable of detecting accretion, formation, or presence of ice. As shown, the aircraft 10 can include wings 11, a first engine system 12 and a second engine system 14. Non-limiting aspects of the aircraft 10 can include fewer or additional engine systems. The first and second engine systems 12, 14 can be substantially identical, and are illustrated as being coupled to the wings 11.

The icing detection system 15 can also include at least one patch or sensor patch 20, which is operably coupled to an aircraft surface 21 and contoured to the aircraft surface 21. In the illustrated example, a set of sensor patches 20 are illustrated as being spaced about the aircraft 10 on various aircraft surfaces 21, including on leading edges of the wings 11 or on the engine systems 12, 14. The set of patches 20 or any subset thereof can be operably or otherwise communicatively coupled by way of a network of electrical wiring 22.

Non-limiting aspects of the aircraft 10 or the icing detection system 15 can further include a controller module 24 having a power source 25, processor 26, and memory 28 operably connected with, among other things, one or more of a set of patches 20, for example, by way of the electrical wiring 22. While the controller module 24 is shown connected with the electrical wiring 22 for brevity and ease of understanding, non-limiting aspects of the disclosure can be included wherein the controller module 24 is communicatively connected with the icing detection system 15 through separate connectors, such as conductive wiring or communication buses. Examples of the controller module 24 can include aircraft 10 operational computers, system, subsystems, or the like. The controller module 24 can be further communicatively connected with at least one display 30 viewable by a pilot, co-pilot, or the like. Non-limiting examples of the display 30 can any sort of indicator or indication device, including flight displays, monitors, computer-based screens, light emitting diodes (LEDs), light bulbs, or combinations thereof.

One non-limiting example of the aircraft 10 can include an electrical power-based heating system (not shown). In this example, the aircraft 10 can include a generator system, electrical storage device (e.g. a battery, supercapacitor, fuel cell, or the like), renewable energy source (e.g. solar cells, wind turbine generator, or the like), or the like, adapted or configured to supply a source of electricity or electrical power. In this sense, heat passages throughout the aircraft (not shown) can be conductive pathways, such as bus bars, power transmission lines, or the like, and power distribution nodes or switching elements (not shown) can enable or disable the supplying of power from the power source to various surfaces of the aircraft including those where the one or more patches 20 are located.

Another non-limiting example of the aircraft 10 can include a fluid-based heating system (not shown), such as a heating system utilizing hot compressed air from at least one of the first or second engine systems 12, 14. Such hot compressed air is commonly referred to as bleed air. The bleed air can be tapped from a bleed-air port of at least one of the first or second engine systems 12, 14 at any suitable portion of the engine core including, but not limited to, one of the compressor section(s) or one of the turbine section(s). Thus, in this example, the bleed air system can divert hot gases through fluid conduit-type passages (not shown) and deliver the bleed air to various surfaces of the aircraft including those where the one or more patches 20 are located, where and when needed. In further non-limiting examples, nozzles can be included to direct the hot bleed air to any suitable portions of the aircraft 10 to melt or prevent the formation of ice.

It will be understood that while aspects of the disclosure are shown in the aircraft environment of FIG. 1, the disclosure is not so limited and has general application to icing detection systems in non-aircraft applications, such as other mobile applications and non-mobile industrial, commercial, and residential applications. It will be understood that the illustrated aspects of the disclosure are only one non-limiting example of an aircraft, and many other possible aspects and configurations in addition to that shown are contemplated by the present disclosure.

Furthermore, the number of, and placement of, the various components depicted in FIG. 1 are also non-limiting examples of aspects associated with the disclosure. For example, while various components have been illustrated with relative position of the aircraft, aspects of the disclosure are not so limited, and the components are not so limited based on their schematic depictions. For instance, specific aircraft surfaces can include, but are not limited to a portion of a wing, an airfoil, an inlet duct, a fuselage, a nacelle, or the like. In another non-limiting example, an aircraft surface can include a sensing area for a sensor, a patch of surface area, a representative location of a surface or aircraft component (e.g. representative of a wing, fuselage, etc.), or a protected surface commonly subjected to icing conditions The aircraft surface can include, for example, an outer surface of the aircraft (e.g. if the thermal properties of the outer surface are such that the thermal time constraint is short, that the surface temperature varies rapidly, or a combination thereof), or the aircraft surface can represent a sensor incorporated into the air stream or environment directly, such as a temperature sensor in an engine inlet.

Figure 2:
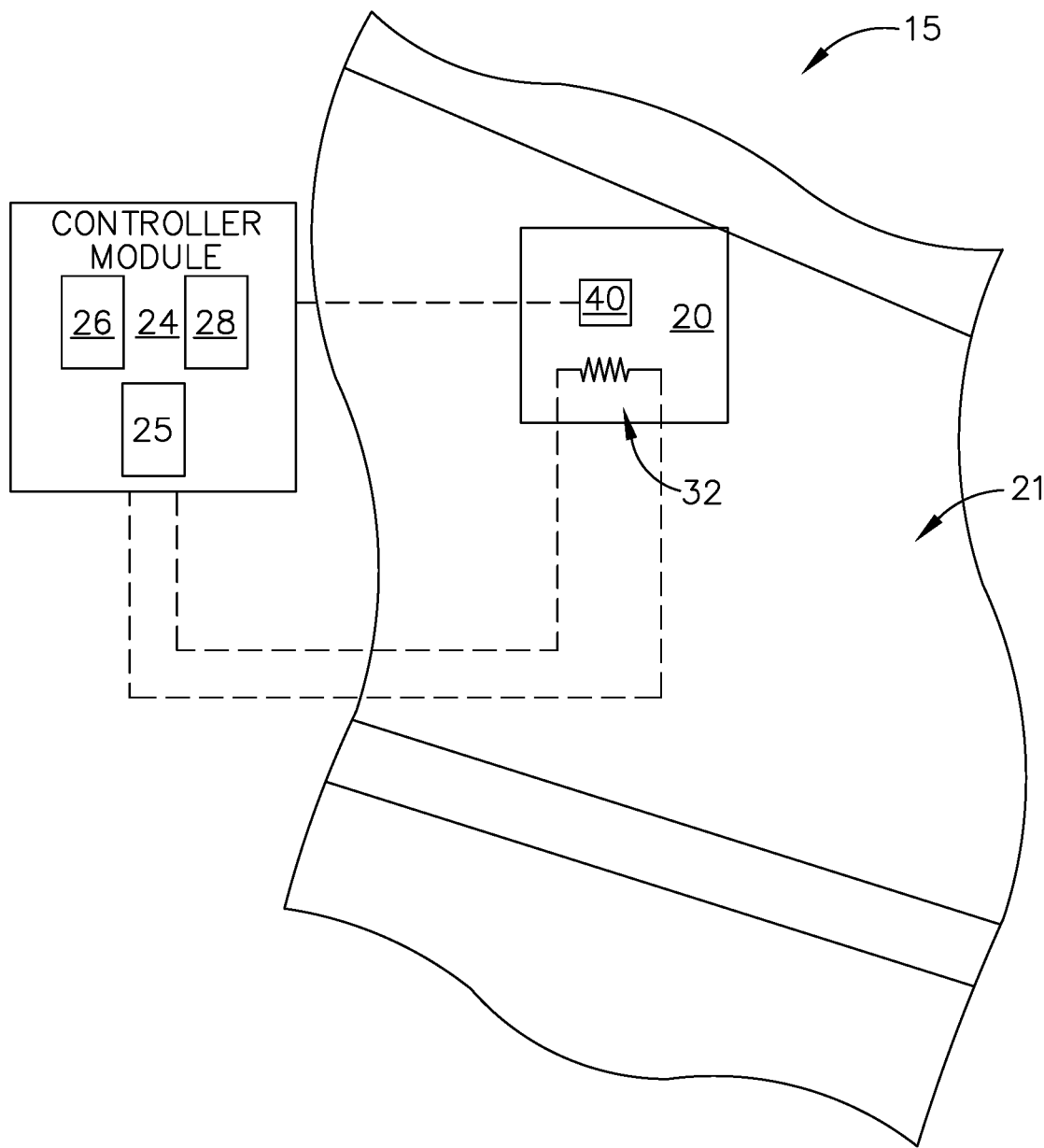
FIG. 2 is a schematic view of a system for determining ice accretion on the aircraft of FIG. 1 in accordance with various aspects described herein.

FIG. 2 illustrates a schematic representation of a portion of the aircraft 10 and icing detection system 15 of FIG. 1. The icing detection system 15 is capable of detecting the accretion or formation of ice on or over the sensor patch 20. As shown, the patch 20 is affixed or otherwise operably coupled to the surface of the wing 11 of the aircraft 10. The patch 20 is communicatively coupled with the controller module 24, such as via the electrical wiring 22 shown in FIG. 1. A heating element 32 is illustrated as being included in the sensor patch 20. It will be understood that the heating element 32 can be any suitable heating element, including a resistive element. In this manner, the controller module 24 can be communicatively connected (via dotted line) with the sensor patch 20 and heating element 32 and operable to controllably enable, energize, or otherwise control the heat generation by the heating element 32.

The sensor patch 20 can also include a sensor 40 which can be any type of sensor, including a thermistor or thermocouple, which is capable of sensing a temperature or a value indicative of a thermal cycling or thermal cycling period. In another non-limiting aspect of the disclosure, aircraft lacking an icing detection system 15, or lacking an ice protection system, can still include a sensor 40 adapted, operable, or enabled to sense a value indicative of a thermal cycle or thermal cycling period of the sensor 40 itself, or another heat generating element such as the heating element 32 adapted to heat or warm the sensor 40 or at least a portion of the sensor patch 20 such that the sensor 40 can obtain a proper or accurate sensor reading or measurement. The sensor 40 can be configured to sense or measure a temperature, heating or thermal cycle or thermal cycling period, including a heating cycle (e.g. temperature increasing period), a cooling cycle (e.g. temperature decreasing period, such as after a heating cycle), a rate of increase or decrease (e.g. a rate of change) in the heating or cooling cycle, or any combination thereof. The sensor 40 can further be adapted to provide the sensing or measuring of the thermal cycle or thermal cycling period to the controller module 24, which can, for example, record, log, or otherwise determine information or data related to the sensed values over a period of time.

Figure 3:
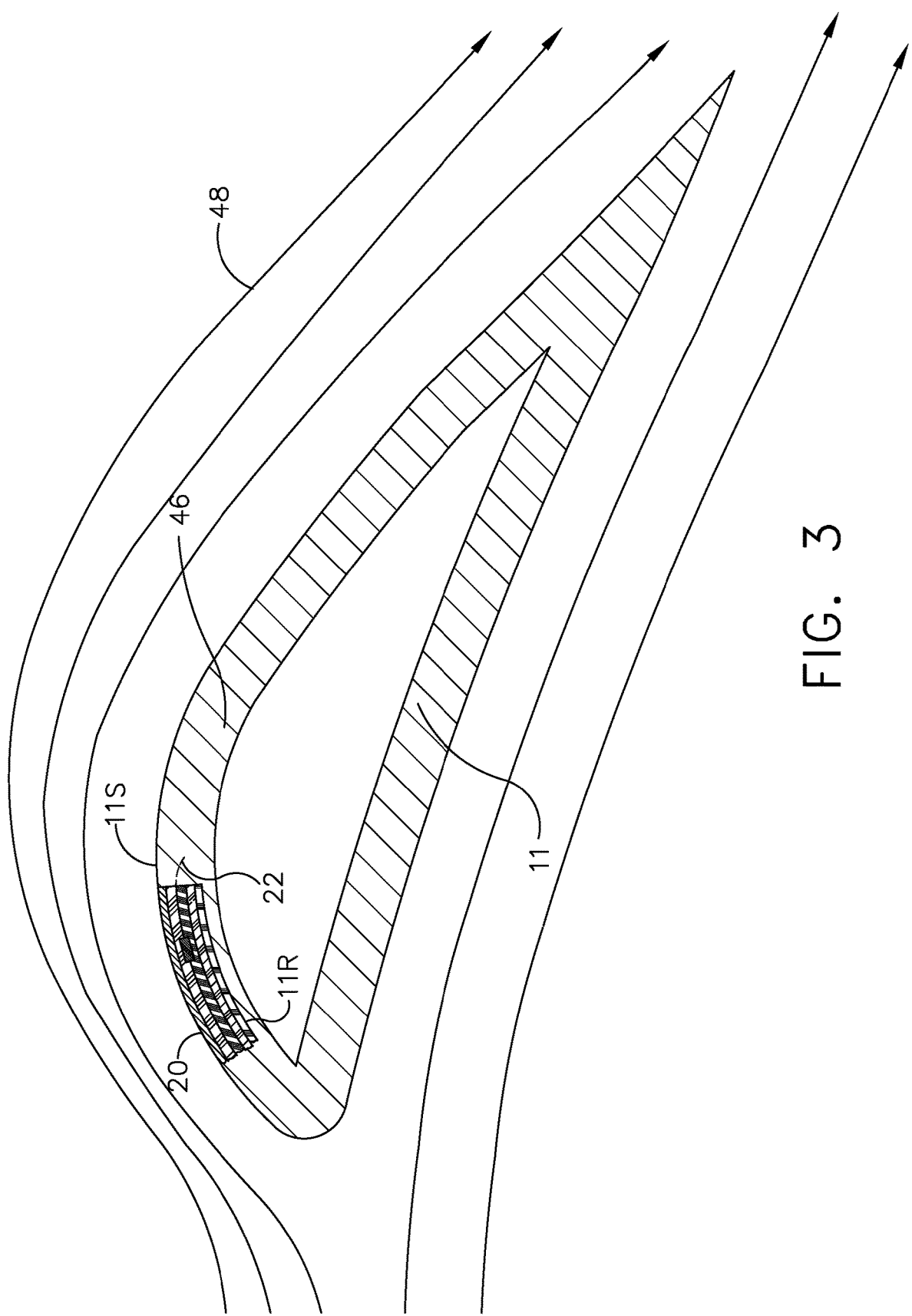
FIG. 3 illustrates a sensor patch which can be utilized in the system of FIG. 2.

Referring now to FIG. 3, a portion of the aircraft 10 is illustrated wherein a sensor patch 20 is positioned along a wing 11. It is contemplated in a non-limiting example that the sensor patch 20 can be embedded within, and contoured over, the wing 11 such that the contour of the sensor patch 20 forms a surface 11S of the wing 11 or any other aircraft surface 21 where the sensor patch 20 may be placed. During operation and forward movement of the aircraft 10, air flows past the wing 11. Airflows 48 are illustrated moving around the wing 11; it will be understood that the size and/or height of the sensor patch 20 has been exaggerated for clarity, and that external airflows 48 can be generally unaffected by the presence of the sensor patch 20 on the aircraft 10. In one example, the sensor patch 20 can be approximately 1 inch in total thickness, with it being understood that other patch thicknesses can also be utilized in the icing detection system 15. Furthermore, electrical wiring 22 may extend from the wing 11 to the sensor patch 20; in non-limiting examples, the wiring 22 can be routed externally to the wing 11, or the wiring 22 can be routed internally through the wing 11 to the patch 20 without significant exposure to the external airflows 48.

Figure 4:
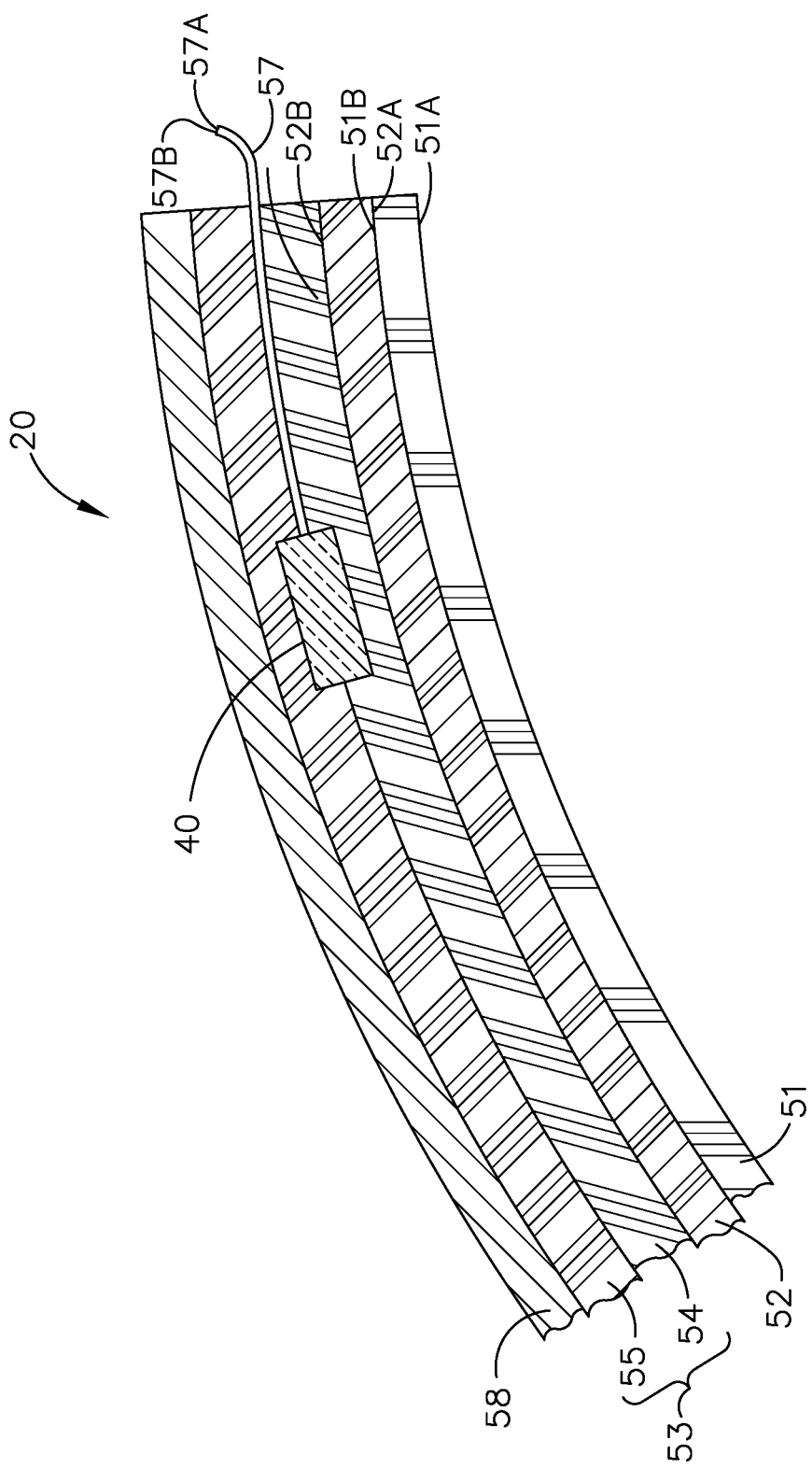
FIG. 4 is a cross-sectional view of the sensor patch of FIG. 3.

Turning to FIG. 4, a cross-sectional view of the sensor patch 20 is illustrated. It is contemplated that the patch 20 can have a layered configuration, including multiple insulating layers as desired. In a non-limiting example, the layered patch 20 has been illustrated with an electro-thermal insulation layer 51, a heat generating layer 52, and a sensor layer 53 incorporating the sensor 40. While the layers are illustrated as having relative thicknesses with respect to each other it will be understood that this is merely exemplary and in no way limiting. In this manner, the heating element 32 and the temperature sensor 40 can be integrally formed in the sensor patch 20.

The electro-thermal insulation layer 51 can include a first side 51A and a second side 51B, where the first side 51A can be positioned adjacent a portion of the aircraft 10, illustrated as a recessed surface 11R of the wing 11. The electro-thermal insulation layer 51 may include any material which is suitable for electric and thermal insulation in the environment of the sensor 40, including dielectrics such as ceramic or fiberglass.

The heat generating layer 52 can incorporate at least one heating element such as the heating element 32 in the schematic diagram of FIG. 2, non-limiting examples of which include discrete resistive heating elements 32 scattered throughout the layer 52, or continuous resistive heating elements 32 in a serpentine or woven arrangement, where the supply of power to the heating element 32 can generate heat. The heat generating layer 52 can also include a first side 52A and a second side 52B, where the first side 52A of the heat generating layer 52 can be coupled to the second side 51B of the electro-thermal insulation layer 51 as shown. In this manner, the surface 11S of the wing 11 can be at least partially insulated from direct heating effects from the heating element 32, which may affect material durability or performance during operation or lifetime of the aircraft 10.

The sensor layer 53 is illustrated as encompassing both a first electrical insulation layer 54 and a second electrical insulation layer 55 along with the sensor 40. The sensor 40 can be configured to sense or detect temperature and can be incorporated in the sensor layer 53, such as by embedding in or between the electrical insulation layers 54, 55. In this manner the first and second electrical insulation layers 54, 55 can be considered as "first and second sensor layers," either or both of which can at least partially incorporate the sensor 40. It is further contemplated that a single "sensor layer" or electrical insulation layer can be utilized with a temperature sensor embedded therein, or that a temperature sensor may be positioned adjacent an electrical insulation layer, in non-limiting examples. The example of FIG. 4 illustrates that the first electrical insulation layer 54 can be positioned adjacent to the second side 52B of the heat generating layer 52, and the second electrical insulation layer 55 can be coupled to the first electrical insulation layer 54 with the temperature sensor 40 embedded therein as described above. Additionally, materials such as ceramics, plastics, or fiberglass can also be included in the first and second electrical insulating layers 54, 55 as appropriate for the environment of the aircraft surface 21 (FIG. 1).

The temperature sensor 40 can further include a wire bundle 57 including at least one wire, and is illustrated with a first wire connection 57A and second wire connection 57B. The wire connections 57A, 57B can be connected into the electrical wiring 22 of FIG. 1 to send data, power, or other signals between the temperature sensor 40 and other desired components in the icing detection system 15 such as the controller module 24. In the example of FIG. 4 the wire bundle 57 can be run from the temperature sensor 40 between two adjacent layers, such as the heat generating layer 52 and electro-thermal insulating layer 51, into the wing 11 for connection with other components therein. It is contemplated in a non-limiting example that the wire bundle 57 can be directed to one end of the sensor patch 20 and externally wired to the wing 11.

A thermally conductive layer 58, illustrated as a thermally conductive erosion shield, can be coupled to the second electrical insulating layer 55 and form an outermost layer of the patch 20, thereby forming the surface 21 of the aircraft 10 while surrounded by, e.g. flush with, the wing surface 11S. The thermally conductive layer 58 can include any suitably conductive material such as aluminum, and in this manner the temperature sensor 40 can be cooled by air flowing past the patch 20 as illustrated in FIG. 3 via the external airflows 48.

During operation, and by way of overview, a known power can be selectively supplied to the heating element 32 while the sensor 40 can sense or measure a value indicative of a thermal cycling period which will be explained in further detail in FIGS. 5-7. The value indicative of the thermal cycling period can include a power value, a temperature value, or the like, over at least one of a period of increasing thermal activity or heating, a period of decreasing thermal activity or cooling, or a combination thereof. The controller module 24, in response to receiving or obtaining the sensed or measured values related to the thermal cycling period, can compare the thermal cycling period with a threshold thermal cycling period. In one non-limiting example, the threshold thermal cycling period can include data, a data range, a time period of heating or cooling, a rate of change thereof, or the like, derived or determined from empirical data or known thermal cycling periods. In another aspect of the disclosure, the threshold thermal cycling period can be predetermined. In yet another non-limiting aspect of the disclosure, the controller module 24 can be communicatively connected with, and receive data from, another aircraft computer system, such as a full authority digital engine control (FADEC), digital computer, flight computer, engine control unit, or the like.

Non-limiting factors which can affect the threshold thermal cycling period indicative of the accretion or formation of ice can include airspeed, angle of airflow impingement (also known as "angle of attack"), air or environmental temperature (for instance, relative to the aircraft or patch 20), air density of the environment, humidity of the environment, liquid water content of the environment, the like, or a combination thereof. The threshold thermal cycling period can also be affected by or based on static factors, including but not limited to, the surface area of the patch 20 associated with the icing detection system 15 or the heating element 32, aerodynamic shape of the aircraft surface 21, internal thermal leakage, or location, orientation, or mounting aspects of the sensor patch 20, or the like.

In another non-limiting aspect of the disclosure, upon the detection of ice accretion on the patch 20 the controller module 24 can operate, operably control, or enable the operation of the heating element 32. The controller module 24 can operably generate a sufficient amount of heat at the patch 20 to melt or otherwise dispose of ice that may be accumulating. In another non-limiting example, the controller module 24 can operate specialized heating cycles of the heating element 32 to increase the rate of heat generated, or to raise the temperature of the patch 20 a threshold heat level, such that the system and method of detecting ice formation can continue to operate.

In yet another non-limiting aspect of the disclosure, upon detection of ice accretion the controller module 24 can provide indication, via the display 30 in one example, or operate another aircraft system (not shown) to change the current aircraft flight plan, heading, direction, or the like, to provide for the removal of accumulated ice. For instance, the indication can include a suggestion for the pilot or co-pilot to alter or modify the flight plan, or can instruct another system or subsystem of the aircraft to create a modified flight plan for review by the pilot or co-pilot. In addition, the controller module 24 can also activate de-icing systems, ice shedding operations, or the like in response to the detection of ice on the patch 20.

In this sense, the icing detection system 15 can operably detect the formation of ice on a structure by way of sensing and comparing a sensed or measured thermal cycling period, or for example, a rate of change thereof, with a threshold thermal cycling period (or rate of change), and determine whether the formation of ice has occurred. Non-limiting aspects can be included wherein the icing detection system further employs or operates anti-icing or de-icing strategies in response to the determination or prediction of the formation of ice. Non-limiting examples of anti-icing or de-icing strategies can include operating the heating element 32 for a longer period of time, reaching a higher heating or temperature set point, or the like.

Figure 5:
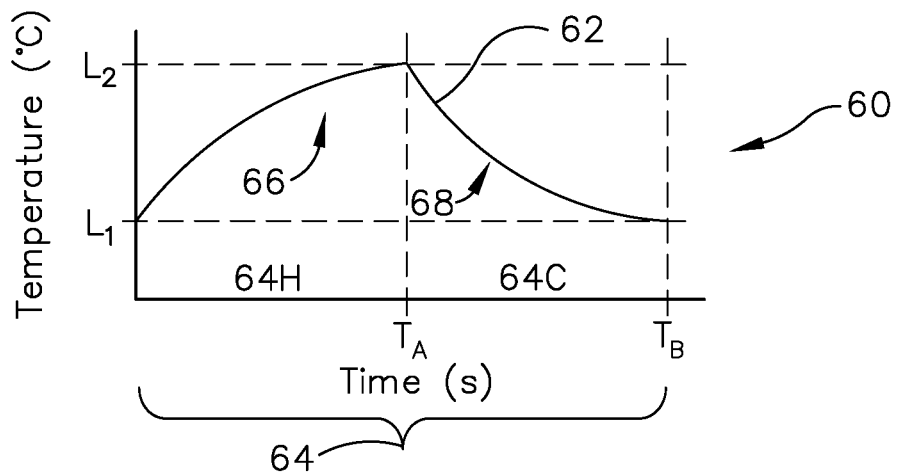
FIG. 5 illustrates a plot graph showing operation of the system of FIG. 2, in accordance with various aspects described herein.

FIG. 5 is a plot graph 60 illustrating an exemplary thermal cycle of the sensor patch 20 in operation. While a known power—in one non-limiting example, 3 Watts per square inch of the heat generating layer 52—is supplied to the heating element 32 (FIG. 2), a sensed value, illustrated as a sensed temperature 62, is logged over a period of time to form a thermal cycling period 64 indicative that ice accretion is not present. A thermal cycling period 64 can include a heating period 64H indicated by a rising sensed temperature 62 from a local minimum level L1 to a local maximum level L2. In the example shown, during the heating period 64H, the sensed temperature 62 can begin with L1 at 5° C. above the ambient air temperature (also known as "above ambient"), increasing at a decreasing rate (e.g. "flattening off") until reaching the local maximum level L2 of 15° C. above ambient at time TA, thereby forming a heating threshold signature 66 indicating that ice accretion is not present. In one example, TA represents a time duration of approximately 7 seconds, and other time durations can be utilized for the heating period 64H. It can be appreciated that the rising sensed temperature 62 can occur due to the operation of the heat generating layer 52 in the sensor patch 20.

It will be understood that L1 and L2 can define temperature thresholds for the heating element 32, wherein the controller module 24 can determine that the heating element 32 has satisfied at least one of the temperature thresholds L1 or L2 while monitoring the temperature sensor 40, and that the monitoring can be continuous or performed at discrete intervals as desired, such as every 0.25 seconds.

The set of thermal cycling periods 64 can also include a cooling period 64C, where the sensed temperature 62 can fall from the local maximum level L2 to the local minimum level L1. In the example shown, during the cooling period 64C, the sensed temperature 62 can begin at L2 e.g. 15° C. above ambient, decreasing at a decreasing rate (e.g. "flattening off") until reaching L1 e.g. 5° C. above ambient at time TB, thereby forming a cooling threshold signature 68 which indicates that ice accretion is not present. In a non-limiting example the time TB represents a time duration twice that of TA, where the heating period 64H and cooling period 64C can have equal time durations. It should be understood that the heating and cooling periods 64H, 64C can be performed over any desired time interval and may not have equal time durations. In addition, the time TB can represent a combined time for the set of thermal cycling periods 64 utilized as a single, combined interval, e.g. 15 seconds in a non-limiting example. It can be further appreciated that the falling sensed temperature 62 can occur due to non-operation of the heat generating layer 52 or heating element 32, where the aircraft surface is cooled by the environment.

It can be appreciated that the thermal cycling periods 64 can be repeated, including alternating between a heating period 64H and a cooling period 64C. Furthermore, while the icing detection system 15 is in use, operation of the heat generating layer 52 can cause the sensor 40 to detect a rise in temperature while air flowing past the thermally conductive layer 58 can act to slow the rate of temperature increase detected by the temperature sensor 40. These actions can result in heating or cooling threshold signatures 66, 68 as shown in the example of FIG. 5, where the shape or profile of the plot during the heating or cooling periods 64H, 64C can be recorded and stored for comparison by the controller module 24. It can be appreciated that factors such as airspeed and ambient air temperature can affect the heating or cooling threshold signatures 66, 68. In one non-limiting example, a faster airspeed can lead to a slower rise in temperature during the heating period 64H due to increased cooling effects; in another non-limiting example, a higher ambient temperature can cause a slower decrease in temperature during the cooling period 64C due to less effective cooling from the surrounding air.

It can be further appreciated that the controller module 24 can compute an expected rise time from L1 to L2 due to the known supplied power to the heating element 32, as well as an expected fall time from L2 to L1 when the heating element 32 is not operated. These rise and fall times can be based on airspeed, ambient temperature, or other external operating factors; where 7 seconds is contemplated for use in the example of FIG. 5, other time durations may also be used as appropriate. In addition, the controller module 24 can adjust the supply of power to the heating element 32 in order to adjust a rise or fall time between L1 and L2 within a desired time interval.

Figure 6:
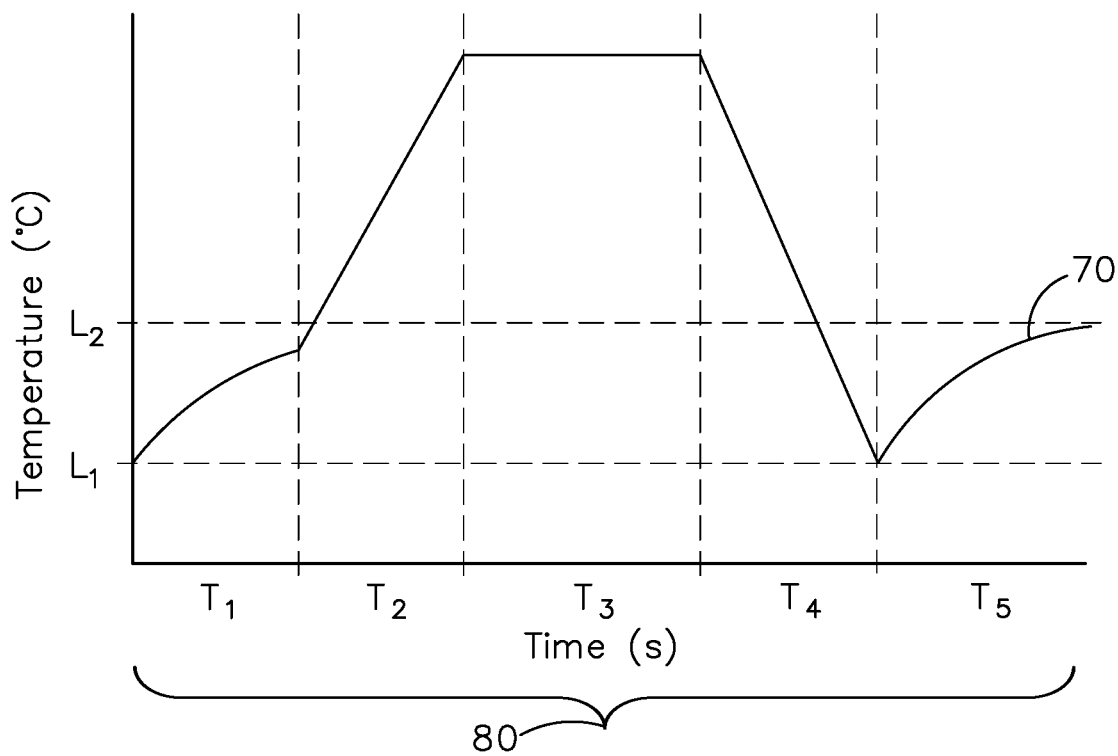
FIG. 6 illustrates another plot graph showing operation of the system of FIG. 2, in accordance with various aspects described herein.

By way of overview, FIG. 6 illustrates a sensed temperature 70 from the temperature sensor 40 which is logged over a set of time periods T1, T2, T3, T4, T5 while the aircraft 10 is in operation. During at least some of these time periods the aircraft is exposed to conditions favorable for the formation of ice, and resulting ice accretion can be sensed by the icing detection system 15. Furthermore, the sensed temperature 70 can be used to define a sensed thermal signature 80 which may include an individual temperature, a range of temperatures, a rate of change of temperature, or a combination thereof. In addition, L1 and L2 will be used to refer to the exemplary local minimum and maximum temperature levels, e.g. 5° C. above ambient and 15° C. above ambient, respectively, with it being understood that any desired temperature can be utilized for L1 and L2. It will be understood that the time periods illustrated in FIG. 6 are each intended to show exemplary aspects of the disclosure, and that the time durations, order, or features described herein may vary.

During the first time period T1, a known power is supplied to the heating element 32 in the heat generating layer 52, and the sensed temperature 70 begins at L1 and ends below the expected maximum temperature level L2 during a first time period T1, for example 7 seconds, or similar to that used during the heating period 64H of FIG. 5. As a result, the temperature sensor 40 takes a longer amount of time to reach the temperature L2 from the starting temperature L1 when compared to the heating threshold signature 66 of FIG. 5. This can be due to conditions favorable to icing, such as increased liquid water content in the environment which is exposed to the patch 20 and sensor 40. In one non-limiting example, a higher liquid water content of the environment can result in a higher or an increased specific heat capacity of the environment, which can increase a needed amount of heat energy to raise the temperature of the sensor 40 to the expected value L2.

During the second time period T2 a sudden rise in the sensed temperature 70 is observed, increasing above the local maximum value L2 over a second time period T2 while the same known power is supplied to the heating element 32 as in the first time period T1. The sudden rise can be linear or nonlinear, and "sudden rise" or "sudden increase" as used herein will refer to the average rate of change of the sensed temperature 70 being greater than the average rate of change in the first time period T1 or in the heating threshold signature 66. The sudden rise in sensed temperature 70 can be caused from the presence of ice over at least a portion of the patch 20. It can be appreciated that solid ice over the patch 20 can reduce the cooling effectiveness of external airflows 48 (FIG. 3) over the patch 20 while the heat generating layer 52 is in operation, thereby causing a greater rate of increase in temperature sensed by the sensor 40 as compared to the average rate of increase in the first time interval T1 or in the heating threshold signature 66. In this manner, a sudden increase in sensed temperature 70 compared with the heating threshold signature 66 can indicate the presence of ice formations on the aircraft surface 21.

The controller module 24 can detect the sudden increase in sensed temperature 70 over the second time period T2; upon this detection, the controller module 24 can indicate that ice accretion has been determined or detected. It is contemplated that the indication can occur for a sudden increase in sensed temperature 70 over a time period of any desired interval. In one example, T2 can be 1 second for the controller module 24 to indicate ice accretion; in another example, T2 can be 5 or more seconds to reduce the possibility of spurious detections of ice accretion. This indication can be sent to the display 30 (FIG. 1) within the aircraft, or to another computer module (not shown), or to an anti-icing or de-icing system within the aircraft. In one example, upon detection of ice accretion, the controller module 24 can increase the power supplied to the heat generating layer 52 to act as an anti-icing measure for the aircraft surface 21. In another example, the controller module 24 can alter or modify a flight plan in response to the detected ice accretion, and the flight plan can be automatically implemented or presented to a pilot for verification.

It can be appreciated that other examples in the spirit of the present disclosure are contemplated for use in the icing detection system 15.

During a third time period T3, the sensed temperature 70 can be constant, or nearly constant, while the heat generating layer 52 is supplied with a known power. The third time period T3 can be of any duration of time, such as 5-15 seconds, or 60 seconds or greater. In this example, the constant sensed temperature 70 can be due to ice accretion that has partially melted such that a layer of liquid water is formed between the accreted ice and the exterior of the patch 20. It can be appreciated that operation of the heat generating layer 52 can cause melting of the portion of accreted ice directly adjacent the patch 20, and a type of equilibrium can result where heat output by the heat generating layer 52 goes into melting the accreted ice which can be shed off the patch 20 by external airflows 48. Furthermore, the controller module 24 can detect the nearly constant sensed temperature by way of little to no rate of change of the sensed temperature 70 over the time period T3. From this, the controller module 24 can determine that accreted ice is present on the sensor patch 20, and that the accreted ice is in the process of melting. As described above, indication of ice accretion can be sent to the display 30 of FIG. 1 or to another computer module (not shown).

During a fourth time interval T4, a sudden decrease in sensed temperature 70 over a fourth time period T4 is illustrated while the heat generating layer 52 is supplied with power. As used herein, "sudden decrease" or "rapid decrease" will refer to a greater rate of decrease of the sensed temperature 70 as compared to the average rate of decrease in the cooling threshold signature 68 of FIG. 5. It will be understood that the time period T4 can represent any duration of time such as 5-10 seconds. When the entire volume of accreted ice is melted and the resulting liquid water is shed, the external airflows 48 moving past the patch 20 can act once again to cool the sensor patch 20 even as the heating element 32 is in operation, which can cause the sudden decrease in temperature. In the example of FIG. 6, the controller module 24 can detect this rapid decrease in sensed temperature 70 following the period of constant sensed temperature 70 during the time interval T3, and determine that no more ice remains on the aircraft surface 21 after an initial determination that ice accretion was detected. The controller module 24 can also cease operation of the heat generating layer 52, provide an indication to a pilot or another avionics system, or modify a flight plan as desired. In the fourth time interval T4, the controller module 24 allows the sensed temperature 70 to fall to the first temperature level L1, e.g. 5° C. above ambient, before implementing the next desired thermal cycle.

During a fifth time period T5, a thermal cycling period can be implemented by the controller module 24 after no accreted ice remains and the sensed temperature 70 begins at the local minimum L1. During a fifth time period T5, in one example 5-15 seconds in duration, the heat generating layer 52 operates in a similar manner to the heating period 64H described in FIG. 5 and the sensed temperature 70 rises to the local maximum value L2 within the expected time period.

The time periods T2, T3, T4 illustrated in the example of FIG. 6 can collectively indicate the presence of ice accretion, including in its various stages of formation, melting, or shedding. Taken as a group, the exemplary sensed temperature 70 can form another signature representing the entire process, e.g. from the beginning stages of ice formation to the final stages of shedding ice. Any individual stage such as T2, T3, or T4 can indicate the presence of ice on the sensor patch 20, and the rate of change of sensed temperature 70 can provide information to the controller module 24 (FIG. 2) regarding a stage, behavior, or amount of ice on the patch 20. It should be appreciated that the sensed temperature 70 can have other profiles not illustrated herein, and that combinations of exemplary profiles can also be utilized or observed during operation of the aircraft 10, for example to form other reference signatures for comparison.

Figure 7:
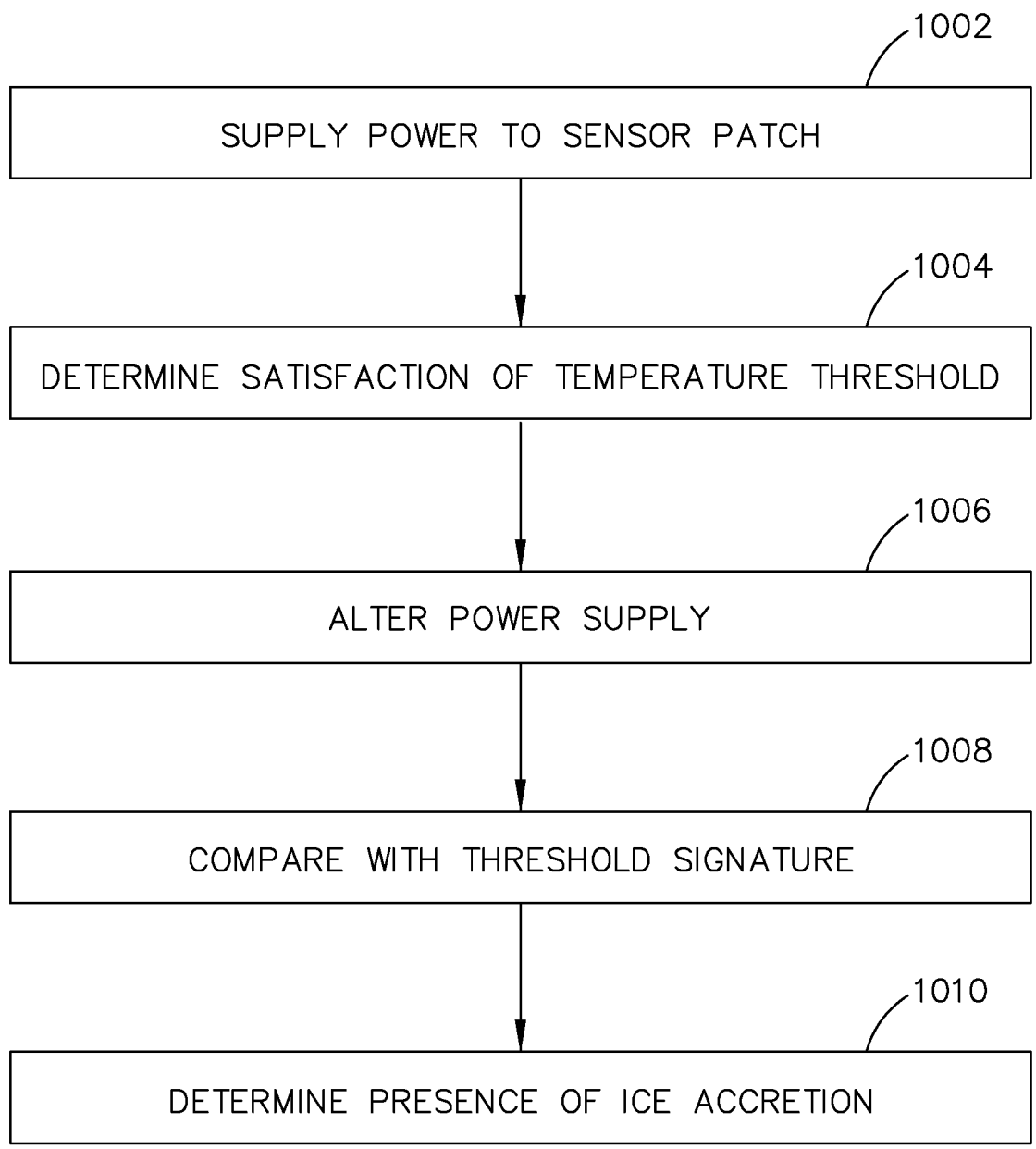
FIG. 7 illustrates a method of detecting the presence of ice accretion on the aircraft of FIG. 1.

Turning to FIG. 7, a method 1000 of determining the presence of ice accretion on a surface of an aircraft is illustrated. At 1002, a known power can be supplied to the heating element 32 within the sensor patch 20, wherein the heating element 32 and the temperature sensor 40 are integrally formed in the sensor patch 20 located on an aircraft surface such as the wing surface 11S, and the sensor patch 20 can be contoured to be aerodynamically consistent with the wing surface 11S. The controller module 24 can monitor the temperature sensor 40 and determine when the heating element 32 has satisfied at least one temperature threshold, such as the threshold levels L1 or L2, at 1004. Upon satisfaction of the at least one temperature threshold, the supply of power to the heating element 32 can be altered at 1006, including increasing the supply of power as in the third time period T3, or supplying no power to the heating element 32 as in the cooling period 64C, while the controller module 24 can continually or periodically monitor or otherwise receive information from the temperature sensor 40.

It will be understood that the temperature sensor 40 can sense a thermal signature 80 of the heating element 32, which can include a single temperature, a collection or range of temperatures, or a rate of change of sensed temperature, in non-limiting examples. At 1008, the controller module 24 can compare the sensed thermal signature 80 with a threshold signature, including the heating threshold signature 66 or the cooling threshold signature 68, or both, and determine if the sensed thermal signature 80 satisfies the threshold signature. The comparison can be used the by controller module 24 to determine the presence of ice accretion on the sensor patch 20 at 1010, and the controller module 24 can indicate that ice accretion has been determined when the sensed thermal signature 80 satisfies the threshold thermal signature, such as in the third time period T3 where a constant sensed temperature is used to indicate the presence of ice in the process of melting. The indication of accreted ice can include providing indication on a display 30 within the aircraft 10 or to an anti-icing system, and can also be used to alter operation of an avionics system based on the indication, including modifying a flight plan, implementing a modified flight plan, or automatically operating a de-icing system in response to the indicating.

The aspects disclosed herein provide a system and method for detecting the accumulation or formation of ice on an aircraft, which also provide for a variety of benefits. Sensor patches can be placed on areas of the aircraft not visible from within the aircraft, or on sensitive portions where ice accretion is most likely to affect aircraft stability during flight, and the sensor patches can also operate in concert with an anti-icing detection system or an ice protection system to melt ice that has already formed. Furthermore, multiple patches can be utilized where a first patch can be operated continually in alternating heating and cooling periods to track an elapsed time for the temperature sensor to reach the local maximum level, while a second patch adjacent the first can act as a de-icing or anti-icing means in the event of the first patch detecting the presence of ice.

Another advantage to aspects of the disclosure can include increased or improved status communication or awareness of the conditions favorable for the formation of ice, leading to increased situational awareness and improved decision making due to ice-based considerations. Such increased situational awareness can be improved even in aircraft without anti-icing or de-icing systems, as the awareness of the formation or accumulation of ice on the aircraft can result in a more strategic flight plan or decision-making.

To the extent not already described, the different features and structures of the various aspects can be used in combination with each other as desired. That one feature cannot be illustrated in all of the aspects is not meant to be construed that it cannot be, but is done for brevity of description. Thus, the various features of the different aspects can be mixed and matched as desired to form new aspects, whether or not the new aspects are expressly described. Combinations or permutations of features described herein are covered by this disclosure.

This written description uses examples to disclose aspects of the disclosure, including the best mode, and also to enable any person skilled in the art to practice aspects of the disclosure, including making and using any devices or systems and performing any incorporated methods. The patentable scope of the disclosure is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method of determining ice accretion on a surface of an aircraft, the method comprising:
    supplying a known power to a heating element included within a heat generating layer, wherein the heating element and a sensor are integrally formed in a layered patch including a thermally conductive layer that forms a surface of the aircraft and has a contour consistent with a surface surrounding the layered patch such that the layered patch is aerodynamically consistent with the surface of the aircraft, the layered patch further including a sensor layer located between the thermally conductive layer and the heat generating layer, the sensor layer further including a first sensor layer and a second sensor layer with the sensor is disposed in-between the first sensor layer and the second sensor layer;
    determining, in a controller module, when the heating element has satisfied at least one temperature threshold;
    altering the supplying of known power to the heating element when it is determined that the heating element has satisfied the at least one temperature threshold;
    sensing, via the sensor, a thermal signature of the heating element to define a sensed thermal signature;
    comparing, in a controller module, the sensed thermal signature with a threshold signature;
    determining, in the controller module, if the sensed thermal signature satisfies the threshold signature;
    indicating, by the controller module, that ice accretion has been determined when the controller module determines that the sensed thermal signature satisfies the threshold signature; and
    altering operation of an aircraft system based on the indication.

2. The method of claim 1 wherein the comparing includes comparing a rate of change of the sensed thermal signature with a rate of change of the threshold signature.

3. The method of claim 1, wherein the comparing further comprises repeatedly comparing the sensed thermal signature with the threshold signature.

4. The method of claim 1 wherein the supplying includes supplying of power until the heating element has satisfied both a first and second temperature threshold.

5. The method of claim 1 wherein indicating includes providing indication on a display within the aircraft.

6. The method of claim 1 wherein the indicating includes providing the altered operation of the system in the form of a flight plan modification, and wherein the altering includes modifying a flight plan.

7. The method of claim 1 wherein the indicating further includes providing indication to a de-icing system, and wherein the altering includes automatically operating the de-icing system in response to the indicating.

8. The method of claim 1 wherein the layered patch further includes at least one insulating layer.

9. The method of claim 8 wherein the layered patch comprises multiple insulating layers, with at least one of the multiple insulating layers comprising an electro-thermal insulating layer.

10. The method of claim 1 wherein the layered patch further includes an electro-thermal insulation layer having a first side adjacent a portion of the aircraft, the heat generating layer incorporating the heating element adjacent a second side of the electro-thermal insulation layer, and an electrical insulation layer adjacent the heating element, the sensor being located adjacent to the electrical insulation layer or within the electrical insulation layer.

11. The method of claim 10 wherein the thermally conductive layer of the layered patch is adjacent the electrical insulation layer.

12. A system for determining ice accretion on a portion of an aircraft, the system comprising:
    a layered patch including a thermally conductive layer that forms a surface of the aircraft and has a contour consistent with a surface surrounding the layered patch such that the layered patch is aerodynamically consistent with the surface of the aircraft, the layered patch comprising:
        a heat generating layer that operates in thermal cycles defined by a first period of time when the heat generating layer generates heat while energized, and by a second period of time when the heat generating layer does not generate heat while not energized;
        a sensor layer located between the heat generating layer and the thermally conductive layer, the sensor layer including a first sensor layer coupled to the heat generating layer, a second sensor layer coupled to the first sensor layer, and a sensor that is disposed in-between the first sensor layer and the second sensor layer, the sensor layer being adapted to sense a thermal cycle indicative of ice accretion at a location of the layered patch;
    a controller module configured to compare the sensed thermal cycle with a threshold thermal cycle, determine if the sensed thermal cycle satisfies the threshold thermal cycle, and indicate that conditions favorable for icing exist when the sensed thermal cycle satisfies the threshold thermal cycle.

13. The system of claim 12 wherein the system further comprises multiple layered patches operably coupled to the controller module.

14. The system of claim 12 wherein the portion of the aircraft is one of a wing or inlet duct of an engine.

15. The system of claim 12 wherein the controller module is further configured to at least one of provide an indication that ice accretion has been determined or alter operation of a system within the aircraft.

16. The system of claim 12 wherein the layered patch further includes at least one insulating layer.

17. The system of claim 16 wherein the at least one insulating layer is an electro-thermal insulating layer.

18. The system of claim 12 wherein the layered patch includes an electro-thermal insulation layer having a first side adjacent a portion of the aircraft, a heat generating layer incorporating a heating element adjacent a second side of the electro-thermal insulation layer, an electrical insulation layer adjacent the heating element, the sensor being located adjacent to the electrical insulation layer or within the electrical insulation layer, and a thermally conductive layer adjacent the electrical insulation layer and forming the surface of the aircraft.

\* \* \* \* \*